United States Patent
Palat et al.

(10) Patent No.: US 10,201,036 B2
(45) Date of Patent: Feb. 5, 2019

(54) PROVIDING INFORMATION ON A MOBILE TERMINAL TO A RADIO RESOURCE MANAGEMENT ENTITY OF A WIRELESS COMMUNICATION NETWORK

(71) Applicants: Sudeep K. Palat, Swindon (GB); Chandrika K. Worrall, Swindon (GB)

(72) Inventors: Sudeep K. Palat, Swindon (GB); Chandrika K. Worrall, Swindon (GB)

(73) Assignee: ALCATEL LUCENT, Boulogne Billancourt (FR)

( * ) Notice: Subject to any disclaimer, the term of this patent is extended or adjusted under 35 U.S.C. 154(b) by 327 days.

(21) Appl. No.: 14/374,898

(22) PCT Filed: Jan. 11, 2013

(86) PCT No.: PCT/EP2013/000082
§ 371 (c)(1),
(2) Date: Jul. 26, 2014

(87) PCT Pub. No.: WO2013/113466
PCT Pub. Date: Aug. 8, 2013

(65) Prior Publication Data
US 2015/0003361 A1 Jan. 1, 2015

(30) Foreign Application Priority Data
Jan. 30, 2012 (EP) .................... 12305113

(51) Int. Cl.
*H04W 76/27* (2018.01)
*H04W 52/02* (2009.01)
(Continued)

(52) U.S. Cl.
CPC ....... *H04W 76/27* (2018.02); *H04W 52/0258* (2013.01); *H04W 76/10* (2018.02);
(Continued)

(58) Field of Classification Search
CPC . H04W 76/02; H04W 76/046; H04W 76/048; H04W 28/18; H04W 28/22;
(Continued)

(56) References Cited

U.S. PATENT DOCUMENTS 8,208,950 B2 * 6/2012 Islam .................... H04W 72/02
370/329
8,681,711 B2 * 3/2014 Balasubramanian .......
H04L 5/0064
370/329

(Continued)

FOREIGN PATENT DOCUMENTS

CN 101352093 A 1/2009
JP 2003-37874 A 2/2003
(Continued)

OTHER PUBLICATIONS

3GPP TS 36.300 v 11.0.0 (Dec. 2011) pp. 118-119.*
(Continued)

*Primary Examiner* — Asad M Nawaz
*Assistant Examiner* — Thomas R Cairns
(74) *Attorney, Agent, or Firm* — Fay Sharpe LLP (57) ABSTRACT

Embodiments relate to concepts for providing information on a mobile terminal to a Radio Resource Management entity (210; 220; 320) of a wireless communication network. Thereby, it is provided, upon an establishment of a Radio Resource Control connection between the mobile terminal (310) and the wireless communication network, information (112; 212) indicative of an estimate of a radio resource utilization for the Radio Resource Control connection to be established.

13 Claims, 4 Drawing Sheets

(51) Int. Cl.
    H04W 76/10    (2018.01)
    H04W 72/04    (2009.01)
    H04W 76/28    (2018.01)
    H04W 76/38    (2018.01)
(52) U.S. Cl.
    CPC .......... H04W 72/048 (2013.01); H04W 76/28
        (2018.02); H04W 76/38 (2018.02); Y02D
        70/1222 (2018.01); Y02D 70/1226 (2018.01);
        Y02D 70/1242 (2018.01); Y02D 70/1262
        (2018.01); Y02D 70/1264 (2018.01); Y02D
        70/23 (2018.01); Y02D 70/24 (2018.01)
(58) Field of Classification Search
    CPC ..... H04W 28/26; H04W 72/04; H04W 72/02;
        H04W 72/005; H04W 24/08; H04W
        76/068; H04W 72/048; H04W 52/0258;
        H04W 76/10; H04W 76/27; H04W 76/28;
        H04W 76/38; Y02D 70/1222; Y02D
        70/1226; Y02D 70/1242; Y02D 70/1262;
        Y02D 70/1264; Y02D 70/23; Y02D 70/24
    USPC .................................................. 370/329, 252
    See application file for complete search history.

(56)         References Cited

U.S. PATENT DOCUMENTS

| 8,744,367 | B2* | 6/2014 | Gerber .............. | H04W 76/068 |
| | | | | 370/465 |
| 8,838,105 | B2* | 9/2014 | Fu ...................... | H04W 36/0055 |
| | | | | 370/331 |
| 2008/0242292 | A1 | 10/2008 | Koskela et al. | |
| 2009/0268689 | A1 | 10/2009 | Fu et al. | |
| 2011/0199984 | A1* | 8/2011 | Umesh ................ | H04L 1/1829 |
| | | | | 370/329 |
| 2012/0002614 | A1 | 1/2012 | Erici et al. | |
| 2013/0137431 | A1* | 5/2013 | Aminaka ............. | H04B 7/155 |
| | | | | 455/435.1 |

FOREIGN PATENT DOCUMENTS

| KR | 10-2008-0089729 A | 10/2008 |
| KR | 10-2011-0110859 A | 10/2011 |
| WO | WO 2008/087524 A2 | 7/2008 |
| WO | 2011/041459 A1 | 4/2011 |
| WO | WO 2011/098661 A1 | 8/2011 |

OTHER PUBLICATIONS

Nokia et al., "Handover Failure Recovery," 3$^{rd}$ Generation Partnership Project (3GPP), 3GPP TSG-RAN WG2 Meeting #58, R2-071717, 4 pages, Kobe, Japan, May 7-11, 2007.
"3$^{rd}$ Generation Partnership Project; Technical Specification Group Radio Access Network; Evolved Universal Terrestrial Radio Access (E-UTRA); Radio Resource Control (RRC); Protocol specification (Release 10)," ETSI TS 136.331, V10.4.0, pp. 1-299, XP050555028, Jan. 2012.
"3$^{rd}$ Generation Partnership Project; Technical Specification Group Radio Access Network; Evolved Universal Terrestrial Radio Access (E-UTRAN); X2 application protocol (X2AP) (Release 10)," ETSI TS 136.423, V10.4.0, pp. 1-136, XP050554670, Jan. 2012.
"3$^{rd}$ Generation Partnership Project; Technical Specification Group Radio Access Network; Evolved Universal Terrestrial Radio Access (E-UTRAN); S1 Application Protocol (S1AP) (Release 10)," ETSI TS 136.413, V10.4.0, pp. 1-261, XP050554669, Dec. 2011.
"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," ETSI TS 136.300, V10.4.0, pp. 1-207, XP050553479, Jun. 2011.
Huawei et al., "Signalling overhead of diverse data applications," 3$^{rd}$ Generation Partnership Project (3GPP), 3GPP TSG-RAN WG2 Meeting #76, R2-116167, 10 pages, XP050564472, San Francisco, USA, Nov. 14-18, 2011.
Research in Motion UK Limited, "Way Forward for LTE RAN Enhancements for Diverse Data Applications," 3$^{rd}$ Generation Partnership Project (3GPP), 3GPP TSG-RAN WG2 Meeting #73bis, R2-112171, 4 pages, XP050494554, Shanghai, China, Apr. 11-15, 2011.
3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300, V11.0.0, pp. 1-194, XP050555023, Dec. 2011.
International Search Report for PCT/EP2013/000082 dated Mar. 18, 2013.
European Search Report for EP12305113.8 dated Jun. 28, 2012.
"3rd Generation Partnership Project; Technical Specification Group Radio Access Network; Evolved Universal Terrestrial Radio Access (E-UTRA); Radio Resource Control (RRC); Protocol specification, (Release 10)" 3GPP TS 36.331 V10.4.0 (Dec. 2011), Technical Specification, pp. 1-296.

* cited by examiner

PROVIDING INFORMATION ON A MOBILE TERMINAL TO A RADIO RESOURCE MANAGEMENT ENTITY OF A WIRELESS COMMUNICATION NETWORK

Embodiments of the present invention relate to wireless communications and, in particular, to providing mobile terminal specific information to a Radio Resource Management (RRM) entity of a wireless communication network at the time of Radio Resource Control RRC connection setup and/or release.

BACKGROUND

Demands for higher data rates for mobile services are steadily increasing. At the same time modern mobile communication systems, as $3^{rd}$ Generation (3G) systems and $4^{th}$ Generation (4G) systems, provide enhanced technologies, which enable higher spectral efficiencies and allow for higher data rates and cell capacities. Moreover, new services and service types are being continuously introduced, such that the range and variety of services and/or applications in current and future mobile networks are expanding.

These services or applications, which may be run on modern smartphones, for example, typically have quite diverse data traffic characteristics. For example, some services/applications may be characterized or classified as background traffic. Such background traffic may, for example, be characterized by long periods of traffic inactivity (e.g. several minutes), where no user plane data is exchanged between a mobile terminal, which may also be referred to as User Equipment (UE) according to the 3GPP ($3^{rd}$ Generation Partnership Project) terminology, and the wireless network it is attached to, followed by relatively short bursts of traffic activity (few second), wherein data is exchanged between the mobile terminal and the wireless network. Other popular services/applications include instant messaging between multiple mobile terminals, wherein instant messaging may be characterized by a moderate period of data packet inter arrival time (e.g. few seconds) and low data rates (e.g. 30-100 Bytes/s in average). Mobile terminals in current and future wireless networks may have enabled diverse data application and most of the time will only be communicating with the network for delivery or reception of user traffic originating from diverse data applications. In order to handle a large number of mobile terminals with diverse data application, a wireless communication network's Radio Resource Management (RRM) could take into account the respective application characteristics.

In various wireless communication networks, a mobile terminal stays in a so-called idle mode until a request to establish an RRC (Radio Resource Control) connection is transmitted to the wireless network. In idle mode a Radio Network has no information on an individual mobile terminal, and can only address, for example, all mobile terminals in a radio cell or all mobile terminals monitoring a paging occasion. A mobile terminal may transit from idle mode to connected mode when an RRC connection is established, wherein the RRC connection may be defined as a point-to-point bidirectional connection between RRC peer entities in the mobile terminal and the wireless network, as, for example, the UMTS (Universal Mobile Telecommunications System) Terrestrial Radio Access Network (UTRAN) or the evolved UMTS Terrestrial Radio Access Network (eUTRAN) which is the air interface of 3GPP (3rd Generation Partnership Project) Long Term Evolution (LTE).

For example, the wireless network may keep a mobile terminal is RRC connected mode while configuring RRC-connected-mode-long Discontinuous Reception (DRX) functions which enable the mobile terminal to turn off the downlink receiver while not monitoring the established RRC connection. The DRX procedure allows a battery power saving at the mobile terminal. Thereby, the mobile terminal and the network negotiate phases or time-intervals in which data transfer occurs. During other times the mobile terminal may turns its receiver off in order to enter a low power state. For example, the network may configure a DRX period to match data traffic or packet inter-arrival times of the diverse applications. An application or data traffic trace is normally built up over time at the wireless network. Therefore, it may take some time to identify the data traffic profile of a particular mobile terminal and, hence, configure the radio resources (e.g.: DRX configuration) after an RRC connection has been established for the service/application. Mobile terminals being in RRC connected mode create signaling traffic in particular due to the mobile terminal's mobility (e.g. handover signaling, measurement reports, etc.). Additionally, a large number of connected mobile terminals create network signaling. A server capacity requirement for handling the signaling traffic also increases with the number of connected mobile terminals. Therefore, mobile terminal battery consumption, radio resource configuration and signaling load should be carefully taken into account when making a decision to keep a mobile terminal in RRC connected mode.

The network may release the RRC connection of a mobile terminal if a so-called dormancy timer running at the network expired for the mobile terminal after a given period of data traffic inactivity, or, due to the network's decision to release the connection. For example, a mobile terminal may initiate a RRC connection for a Voice over IP (VoIP) call and upon the ending of the VoIP call the network may release the RRC connection of the mobile terminal. Releasing the RRC connection for mobile terminals with frequent data traffic will lead to frequent idle-connected transitions, which may lead to a significant amount of network signaling.

Even though the network may trace a mobile terminal's data traffic and may have knowledge on the data traffic characteristics, any mobile terminal specific information at the radio network is removed upon, i.e. shortly before or after, the RRC connection release. That is to say, if a UE establishes a new connection after a period of inactivity, even though the mobile terminal's supported software applications have not been changed between a RRC connection release and a subsequent RRC connection setup, the network does not have any knowledge of the mobile terminal's traffic characteristic and, hence, an optimal configuration of radio resources is not possible until the network traces the user traffic again in order to identify the traffic profile.

SUMMARY

It is one finding of the present invention that it may be beneficial for a wireless communication network to have knowledge of a mobile terminal's data traffic and/or mobility profile already upon establishment of a new RRC connection for an efficient allocation of radio resources and radio management for mobile terminals with diverse data application/service. In the following the mobile terminal's data traffic and/or mobility profile will also be referred to as information on radio resource utilization of the mobile terminal. Embodiments of the present invention suggest providing information on a past or future radio resource utilization of the mobile terminal to a corresponding network element, e.g. a base station, at or upon the establishment of a new RRC connection between the mobile terminal and the wireless network. Thereby the provided radio resource utilization information, e.g. a traffic/UE profile, may be based on the radio resource utilization of a previous RRC connection or it may be an expected radio resource utilization based on knowledge on (various) software applications running on the mobile device at the time of RRC connection establishment. Hence, the provided information indicates an estimate of the radio resource utilization for the newly established RRC connection base on past or expected values.

Hence, according to a first aspect of the present invention, it is provided an apparatus for providing information on a mobile terminal to a Radio Resource Management (RRM) entity of a wireless communication network. The apparatus comprises means for providing, upon an establishment of a new RRC connection between the mobile terminal and the wireless communication network, information indicative of an estimate of radio resource utilization for the new RRC connection to be established, which will also be referred to as (newly) established RRC connection in the sequel. In other words, the information indicative of the estimate of the radio resource utilization for the newly established RRC connection may be provided to the RRM entity before, during or right after the establishment of the new RRC connection between the mobile terminal and the wireless communication network.

Thereby the RRM entity may be regarded as a centralized or decentralized network entity which may handle the Radio Resource Management (RRM), particularly the dynamic RRM, of one or more mobile terminals attached to the wireless network. For example, the RRM entity may be co-located or coupled to a Radio Access Network (RAN) element, such as, for example, a base station serving the mobile terminal. Dynamic RRM schemes adaptively adjust radio network parameters to traffic load, user positions, quality of service requirements, etc. In general, RRM may handle a system level control of co-channel interference and other radio transmission characteristics in the wireless communication system. RRM involves strategies and algorithms for controlling various parameters such as transmit power, channel allocation, data rates, handover criteria, modulation schemes, error coding schemes, etc. In particular, RRM or the RRM entity may also handle a so-called dormancy timer used at the base station. For example, when a software application running on a mobile terminal in RRC idle mode needs to send or receive data packets, the mobile terminal may request an RRC connection (i.e. RRC connected mode) in order to obtain an active Radio Frequency (RF) connection to the wireless communication network using a plurality of RRC signaling messages. After a last data packet has been transmitted or received, the wireless communication network, or the RRM entity thereof, will release the RRC connection and the mobile terminal will transition to RRC idle state after the dormancy timer expires. Thereby the dormancy timer is typically set by a network operator in a range from 5 to 30 seconds. If an additional packet requires delivery to a dormant or idle mobile device, a new RRC connection is required, and the signaling process starts again. However, according to embodiments of the present invention said dormancy timer may be set individually for a newly established RRC connection between the network and the mobile terminal based on the provided information indicative of the estimate of the radio resource utilization.

Hence, according to a further aspect of the present invention, it is also provided a RRM entity of the wireless communication network, wherein the RRM entity is operable to perform a mobile terminal specific RRM function or algorithm based on the provided information indicative of the estimate of the radio resource utilization for the newly established RRC connection between the mobile terminal and the wireless communication network. Thereby, the radio resource utilization information may have been provided to the RRM entity either from another network entity, e.g. a Core Network (CN) entity, such as, for example, a Mobility Management Entity (MME), or by the mobile terminal upon an establishment of said RRC connection. In other words the radio resource management entity may be operable to receive, upon an establishment of a new RRC connection between a mobile terminal and the wireless communication network, the information indicative of the estimate of the radio resource utilization for the RRC connection to be established, and to perform a mobile terminal specific radio resource management function based on the received information.

For example, the information indicative of the estimate of the radio resource utilization may comprise information indicative of an inactivity-duration while the mobile terminal has not received or transmitted any user specific data from or to the wireless communication network in a previous RRC connection (inactivity timer). Based on such an inactivity-duration comprised by a data traffic profile, the RRM entity may, for example, be operable to individually adjust DRX parameters, such as a DRX inactivity timer, an on duration timer, a DRX cycle, etc., for the mobile terminal. Alternatively or additionally, the RRM entity may initiate a release of the established RRC connection after an inactivity period of the mobile terminal corresponding to said inactivity-duration. That is to say, the wireless communication network, or the RRM entity thereof, will release the RRC connection and the mobile terminal will transition to RRC idle state only after the signaled mobile terminal specific duration, i.e. the dormancy timer, expires. In summary, the RRM entity may, hence, adjust RRM inactivity timer values specifying inactive time periods or states, when a mobile terminal does not need to monitor an RRC connection and may hence save battery power. In other words the RRM entity may be operable to configure a DRX cycle or initiate a release of the established RRC connection after an inactivity period of the mobile terminal based on said inactivity-duration.

Hence, embodiments of the present invention may avoid the aforementioned heavy RRC signaling load due to too short and fixedly set dormancy timer values at the network side. Here, dormancy timers tailored to the specific data traffic profile of the individual mobile terminal may be determined based on the provided radio resource utilization estimates.

According to various embodiments the wireless communication network may, for example, correspond to one of the cellular communication systems standardized by the $3^{rd}$ Generation Partnership Project (3GPP), as Universal Terrestrial Radio Access Network (UTRAN) or Evolved UTRAN (E-UTRAN), e.g. Universal Mobile Telecommunication System (UMTS), a Global System for Mobile Communication (GSM) or Enhanced Data Rates for GSM Evolution (EDGE) network, a GSM/EDGE Radio Access Network (GERAN), Long-term Evolution (LTE) or LTE-Advanced (LTE-A). Generally, any system based on at least one of Code Division Multiple Access (CDMA), Orthogonal Frequency Division Multiple Access (OFDMA), Frequency Division Multiple Access (FDMA), Time Division Multiple Access (TDMA), etc. In the following the terms wireless communication system and cellular communication system/network are used interchangeably.

Thus, depending on the wireless communication network, a base station may correspond to a NodeB, an eNodeB, an access point, etc. A base station may operate multiple cells on one or more frequency layers, in some embodiments a cell may correspond to a sector. For example, sectors can be achieved using sector antennas, which provide a characteristic for covering an angular section around a remote unit or base station.

In various embodiments, the mobile terminal may be associated or coupled to a transceiver of the mobile or wireless end of one of the above networks, i.e. the mobile terminal may correspond to a smartphone, a cell phone, a user equipment, a laptop, a notebook, a personal computer, a Personal Digital Assistant (PDA), an Universal Serial Bus (USB)-stick, a car, etc.

Moreover, the term radio resources may be understood as an element or a combination of elements of the group of a frequency resource, a bandwidth, a carrier, a sub-carrier, a time resource, a radio frame, a time slot, a symbol, a sub-frame, a Time Transmission Interval (TTI), a code resource, an Analog Spectrum Modulation (ASM) symbol, a Digital Spectrum Modulation (DSM) symbol, a Frequency Shift Keying (FSK) symbol, a Phase Shift Keying (PSK) symbol, a Pulse Code Modulation (PCM) symbol, a Quaternary Amplitude Modulation (QAM) symbol, a Frequency Hopping Spread Spectrum (FHSS) sequence, a Direct Sequence Spread Spectrum (DSSS) sequence, etc. In embodiments the plurality of radio resources may thus correspond to one of or a combination of the group of time resources, frequency resources, coding resources or transmission techniques. For example, a Data Radio Bearer (DRBs) also comprises a combination of physical radio resources and, hence, may be regarded as a radio resource itself.

In some embodiments of the present invention the provided information indicative of the estimate of the radio resource utilization for the newly established RRC connection may comprise information on a radio resource utilization of a previous, i.e. past, RRC connection between the mobile terminal and the network, wherein the previous RRC connection had been established as well as released before the establishment of the new RRC connection between the mobile terminal and the network. That is to say, the means for providing the information may be operable to provide information of a radio resource utilization related to a previous RRC connection between the mobile terminal and the wireless communication network, wherein the previous RRC connection precedes the established RRC connection.

The information on the radio utilization may comprise a mobile terminal specific data traffic and/or mobility profile being indicative of at least one of a radio resource configuration for the mobile terminal during the previous RRC connection, information indicative of am inactivity duration while the mobile terminal has not received or transmitted any user specific data from or to the wireless communication network in the previous RRC connection (UE-Inactive Time), or information indicative of the mobile terminal's last visited cells of the wireless communication network during the previous RRC connection (mobility profile). For example, the mobility profile may be used to set dormancy timers such that signaling-intensive handovers during an established RRC connection may be avoided. This may be beneficial in particular for fast moving mobile terminals.

In some embodiments of the present invention the means for providing the information may operable to store the information of the radio resource utilization related to the previous RRC connection upon, i.e. during or after, a release of the previous RRC connection between the mobile terminal and the wireless communication network. The storing may be either done on the network side or on the mobile terminal's side. That is to say, either a network entity, such as a core network element, base station or MME, may store the information on the radio resource utilization related to the previous RRC connection upon the release of the previous RRC connection, or the mobile terminal may store said information. The storage may also involve updating or averaging radio resource utilization information comprising radio resource utilization information of more than one previous RRC connection. In this way it is possible to determine a (weighed) average of a plurality of former radio resource utilization parameters.

For this first case (i.e. information is stored at the network side) the means for providing the information may be operable to, upon the release of the previous RRC connection, provide the information to a network entity, such as a MME, of the wireless communication network and to store said information in a memory device of the network entity (e.g. MME), and to provide at least a part of the stored information to a base station the mobile terminal is attached to upon the establishment of the RRC connection. Hence, in this case the apparatus for providing the information on the mobile terminal to the RRM entity may be comprised by one or more network entities of the wireless communication network, such as, for example, core network elements, base stations and/or MMEs. Thereby, a MME is a key control-node for the LTE access-network. For example, it is responsible for idle mode UE tracking and paging procedure including retransmissions. It is involved in the bearer activation/deactivation process and is also responsible for choosing the Serving GateWay (SGW) for a UE at the initial attach and at time of intra-LTE handover involving Core Network (CN) node relocation. It is also responsible for authenticating the user.

In case the information is stored in a MME, the means for providing the information may also be operable to signal the radio resource configuration information between a base station and the MME entity using a wired interface between the base station and the core of the wireless communication network. In LTE, for example, the S1 interface may be used for this purpose. Hence, the means for providing may comprise a memory or storage and/or a inter network element interface.

Storing the information on the radio resource utilization related to the previous RRC connection, such as a previous UE specific data traffic and/or mobility profile, at the network side may have the advantage that only inter-network-element-signaling over wired interfaces is required. Hence, no modification to existing UEs or to existing air interfaces is necessary. Further, the radio resource utilization information, which is known at the network prior to the RRC connection release anyway due to radio resource utilization tracing of RRC connected UEs, can easily be stored at the network. As the network-based concept only involves inter-network-element-signaling, it is possible to introduce additional signaling parameter(s) to be stored without impacting the UE. However, other embodiments of the present invention also comprise the provision of the information indicative of the estimate of the radio resource utilization for the newly established RRC connection upon the establishment of the new RRC connection from the mobile terminal to the wireless communication network. For example, a UE/traffic profile may be stored at the mobile terminal upon RRC connection release of the previous RRC connection. Thereby the respective information may be present at the mobile itself or it may be provided by downlink network signaling. Upon the establishment of the new RRC connection, the UE may deliver the stored UE/traffic profile information e.g. to a base station. Latter information may be used by the base station or an attached RRM for optimal configuration of radio resources for the UE. In this case the apparatus for providing the information on the mobile terminal to the RRM entity of the wireless communication network may hence be comprised by the mobile terminal itself.

For the aforementioned case, i.e., when the information on the radio resource utilization related to the previous RRC connection is stored on the mobile terminal side, the means for providing the information may be operable to provide said information from the mobile terminal to the wireless communication network via one or more RRC signaling messages (or parts thereof) upon the establishment of the new RRC connection. The means for providing the information may also be operable to store the information of the previous RRC connection in a memory device of the mobile terminal upon the release of the previous RRC connection and to provide at least a part of the stored information to a network entity of the wireless communication network upon the establishment of the new RRC connection. For storing the radio resource utilization information a mobile terminal integrated storage, such as e.g. a FLASH memory, may be used.

According to a further aspect of the present invention, a mobile terminal may also provide an expected data traffic profile at the establishment of the new RRC connection based on information related to applications running on the mobile terminal and their associated expected data traffic pattern(s) at the time of RRC connection establishment. Here, the means for providing the information indicative of the estimate of the radio resource utilization may thus be operable to provide said information based on information on application software which is running on the mobile terminal at the time of the establishment of the RRC connection between the mobile terminal and the wireless communication network.

The latter two aspects falling under the provision of the information indicative of the estimate of the radio resource utilization from the mobile terminal to the wireless communication network would both require corresponding new RRC signaling (fields) over the radio interface in order to deliver the information from the mobile terminal to the network upon the RRC connection establishment.

According to yet a further aspect it is provided a method for providing information on a mobile terminal to a RRM entity of a wireless communication network, wherein the method comprises a step of providing, upon an establishment of a RRC connection between the mobile terminal and the wireless communication network, information indicative of an estimate of a radio resource utilization for the established RRC connection. Thereby, as has been explained before, the step of providing may be performed by either a network entity or the mobile terminal. In a further step, a mobile terminal specific radio resource management, e.g. with respect to dormancy timer, may be performed based on the provided information indicative of the estimate of the radio resource utilization. The latter step may be performed by a network entity, as, for example, a RRM entity coupled to a base station.

Some embodiments comprise a digital control circuit installed within the apparatus for performing the method or steps thereof. Such a digital control circuit, e.g. a digital signal processor (DSP), needs to be programmed accordingly. Hence, yet further embodiments also provide a computer program having a program code for performing embodiments of the method, when the computer program is executed on a computer or a digital processor. Embodiments of the present invention allow for an optimal radio resource configuration and radio resource management. This is especially important when a large number of smart UEs with diverse data application need to be supported in the wireless network. Embodiments may provide efficient resource allocation, improved UE power saving and reduced signaling load.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

According to the current LTE standard, the network may perform data traffic and/or mobility profile trace for RRC connected mobile terminals or UEs. Also, the network may use a dormancy timer at a serving base station or eNodeB to monitor activity or inactivity of user plane traffic for an associated RRC connected UE. The dormancy timer or DRX setting at the network side is implementation dependent and different base station vendors may use different values or parameters.

At a preparation for a handover of a UE from a source cell to a target cell, the source cell's serving base station may signal the target base station the UE-specific radio resource utilization information to assist the target base station with optimal radio resource configuration and radio management. A radio resource configuration used in the source cell may be communicated to the destination or target base station. In addition, an inactivity-duration, while the mobile terminal has not received or transmitted any user data (UE-InactiveTime), may also be communicated to the target cell. This may primarily be used to estimate when to release the RRC connection if the UE has been in dormancy, i.e. inactive, for a period or in order to configure DRX parameter settings. Moreover, a mobile terminal's history information, the mobile terminal's last visited cell(s) and the time mobile terminal stayed in the visited cell(s) may also propagated to the target base station during handover. The latter information can be used by the target base station of estimating the mobile terminal's mobility profile. Hence, at least one of the radio resource configuration, the inactivity-duration or the data traffic profile, or the mobile terminal's mobility profile may be used to form terminal-specific radio resource utilization information. In current wireless communication networks, such as, for example, LTE, all of the mobile terminal specific radio resource utilization information is however released at the network when the RRC connection of the mobile terminal is released and the mobile terminal transitions from RRC connected to RRC idle mode. In other words: the mobile terminal specific radio resource utilization information, such as the data inactivity-duration, is thrown away and, hence, may not be used by the network once the RRC connection for said mobile terminal has been released.

However, various embodiments of the present invention suggest using at least a part of the mobile terminal specific radio resource utilization information of one or more previous RRC connections for improving particular RRM parameter settings related to a subsequent RRC connection between the mobile terminal and the wireless communication network. Hence, the mobile terminal specific radio resource utilization information of one or more previous RRC connections may be used as an estimate of or a basis for radio resource utilization for a subsequently established RRC connection. A RRM entity, e.g. in or coupled to a base station, may set mobile terminal specific RRM parameters, such as dormancy timer and/or DRX configuration, based on that estimate.

Figure 1:
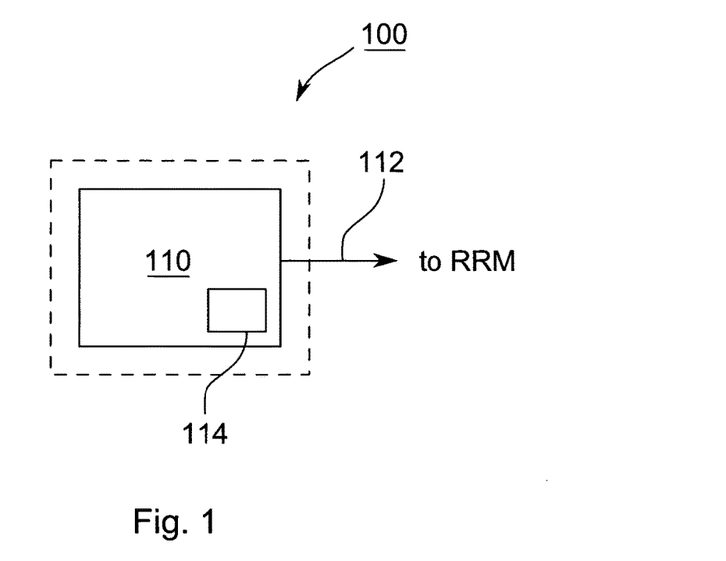
FIG. 1 shows a schematic block diagram of an apparatus for providing information on a mobile terminal to a RRM entity of a wireless communication network, according to an embodiment.

For this purpose, embodiments of the present invention provide an apparatus 100 for delivering information on a mobile terminal to a RRM entity of a wireless communication network, as schematically shown in FIG. 1. The apparatus 100 comprises means 110 for providing, upon an establishment of a new RRC connection between the mobile terminal and the wireless communication network, information 112 indicative of an estimate of radio resource utilization for the newly established RRC connection. Thereby, the radio resource utilization information 112 may be provided to the RRM entity by means of signaling messages or parts thereof. The signaling messages may be exchanged between different network elements or between a network element, such as a base station, and the mobile terminal.

According to some embodiments the estimate may be based on radio resource utilization information of a past or previous RRC connection between the mobile terminal and the wireless communication network. Hence, the means 110 for providing the information 112 may be operable to provide information of a radio resource utilization related to one or more previous RRC connections between the mobile terminal and the wireless communication network, wherein a previous RRC connection precedes the newly or presently established RRC connection. As has been explained above, the radio resource utilization information 112 of the at least one previous RRC connection may comprise a mobile terminal specific data traffic profile and/or a mobility profile. The data traffic profile may again comprise information indicative of an inactivity-duration while the mobile terminal has not received or transmitted any user specific data from or to the wireless communication network in the released previous RRC connection. Such inactivity-duration information may, for example, be used for individually setting dormancy timer values and/or DRX periods for individually adapting RRM functions or algorithms for the mobile terminal.

The means 110 for providing the information 112 may comprise or may be coupled to a storage or memory 114 in order to store or buffer the information 112 of the radio resource utilization related to the previous RRC connection upon a release of the previous RRC connection between the mobile terminal and the wireless communication network. Thereby the storage is adapted to store said information 112 at least between two subsequent RRC connections of the mobile terminal.

The apparatus 100 may be implemented in one or more network elements of the wireless communication network. According to one embodiment the apparatus 100 may be implemented in a base station, e.g. an eNodeB. According to another embodiment, which is exemplarily illustrated in FIG. 2, the apparatus 100 may be implemented in a MME 200 of the wireless network.

Figure 2:
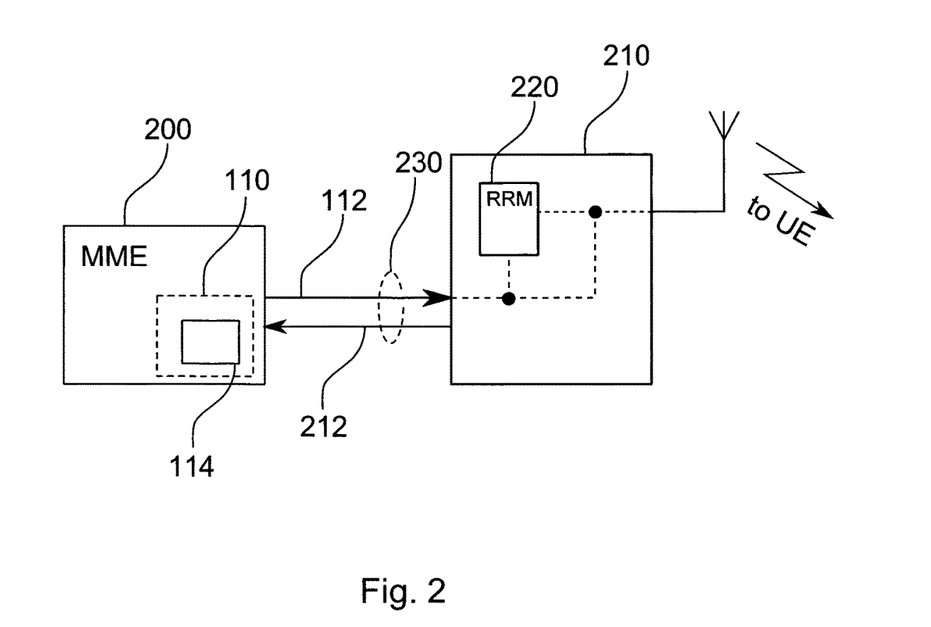
FIG. 2 shows a schematic block diagram of a MME providing information indicative of a stored estimate of a radio resource utilization for the established RRC connection to a base station, according to an embodiment.

FIG. 2 shows an MME 200 comprising the means 110 with storage medium 114 for storing the mobile terminal specific radio resource utilization information 112 related to a preceding RRC connection between the network and the mobile terminal. The MME 200, which is a Core Network (CN) entity, interfaces a RAN entity in form of a base station 210, which again comprises a base station specific RRM entity 220 for adjusting radio network parameters, such as, for example, a dormancy timer, DRX timing, traffic load, user positions, quality of service requirements, etc. Thereby, the one or more radio network parameters may be adjusted based on the stored mobile terminal specific radio resource utilization information 112, which, upon the establishment of a RRC connection between the mobile terminal and the base station 210, may be transferred from the MME 200 to the base station 210 via an inter network element interface 230, such as, for example, the S1 interface for LTE networks. Hence, the means 110 for providing the information may be operable to signal the information 112 between the base station 210 and the MME 200 using a wired interface between the base station 210 and the core of the wireless communication network, i.e. the core network.

Based on the transferred information 112 related to the at least one preceding RRC connection, the RRM entity 220 of the base station 210 may individually adjust UE-specific radio network parameters for the newly established RRC connection, such as, for example, the dormancy timer or DRX parameters. The RRM entity 220 may hence be operable to perform a mobile terminal specific radio resource management for the newly established RRC connection based on the radio resource utilization estimate 112 for the newly established RRC connection between the mobile terminal and the base station 210, wherein the information 112 may have been provided from the MME 200 to the RRM entity 220 upon the establishment of said RRC connection. According to some embodiments the information 112 indicative of the estimate of the radio resource utilization may comprise data traffic information indicative of an inactivity-duration while the mobile terminal has not received or transmitted any user specific data from or to the wireless communication network in the at least one previous RRC connection. The RRM entity 200 may be operable adjust, for example, a dormancy timer value or DRX periods, based on the data traffic information estimate 112, in order to initiate a release of the established RRC connection after an inactivity period of the mobile terminal corresponding to said former inactivity-duration.

Shortly before or after the release of the new (i.e. present) RRC connection, a corresponding latest radio resource utilization information 212, which is available at the base station 210 and which may have been gained by tracing the RRC connected mobile terminal, may be transferred back to the storage 114 of the MME 200 via the inter network element interface 230. In this way, the stored radio resource utilization information 212 of the just released RRC connection may be used as the information 112 indicative of an estimate of a radio resource utilization for the next upcoming RRC connection between the network and the mobile terminal. Hence, the means 110 for providing the information 112, 212 may be operable to, upon the release of the previous RRC connection, provide the information 212 to a MME 200 of the wireless communication network and to store said information 212 in a memory device 114 of the MME 200, and to provide at least a part of the stored information 112, 212 to a base station 210 the mobile terminal is attached to upon the establishment of the next RRC connection with said mobile terminal.

Figure 3A:
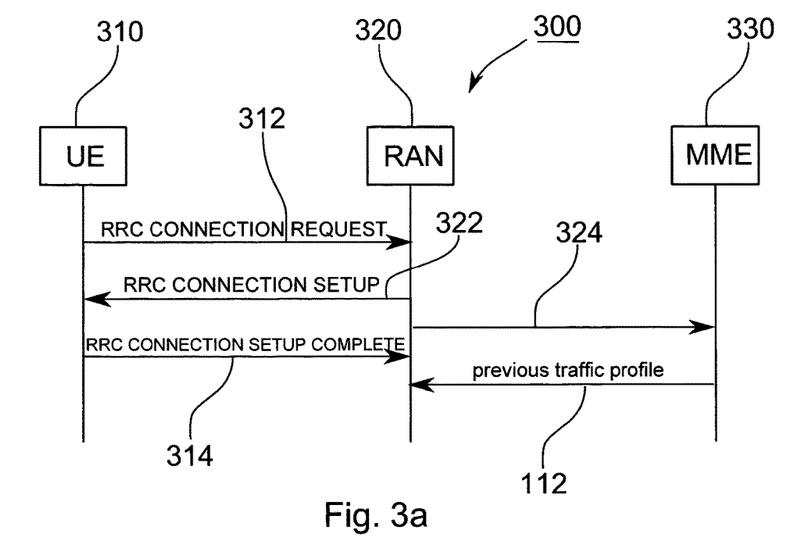
FIG. 3a,b show message sequence charts of a RRC connection establishment and release, according to embodiments.

FIG. 3a shows a message sequence chart 300 of an exemplary RRC connection establishment between a mobile terminal 310 and a RAN entity 320, e.g. a base station.

For example, when a software application running on the mobile terminal 310 being in RRC idle mode needs to send or receive data packets, the mobile terminal 310 may request an RRC connection with an RRC connection request message 312. Upon this RRC connection request message 312 the RAN 320 may respond with a RRC connection setup message 322 and request the stored data traffic profile of the last RRC connection of the mobile terminal 310 (see reference numeral 324). As the mobile terminal 310 has finalized the RRC connection setup, it acknowledges that via a RRC connection setup complete message 314. Before or after the receipt of the mobile terminal's RRC connection setup complete message 314, a core network entity 330, e.g. a MME, may signal the requested mobile terminal specific radio resource utilization information 112 related to one or more preceding RRC connections between the network and the mobile terminal 310 to the RAN entity 320, which may then adapt one or more RRM parameters, such as a DRX and/or dormancy timer value, based on the mobile terminal specific radio resource utilization information 112, such as, e.g., a previous traffic profile.

Figure 3B:
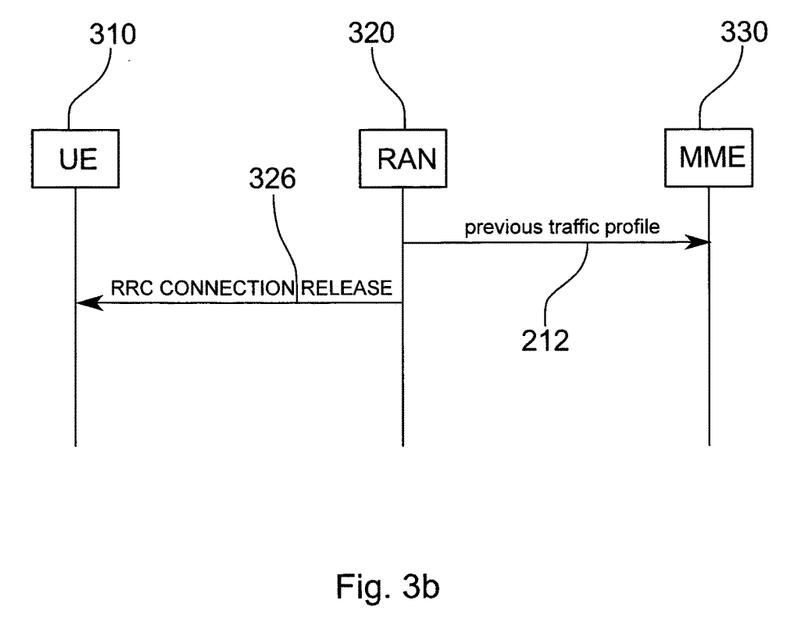

After a last data packet is transmitted or received via the established RRC connection, the wireless communication network, or a RRM entity thereof, may release the established RRC connection and the mobile terminal will transition to RRC idle state after, for example, the adapted dormancy timer expires. An example of this RRC connection release procedure is illustrated in FIG. 3b.

Before or after signaling a RRC connection release message 326 from the RAN entity 320 to the mobile terminal 310, the corresponding latest radio resource utilization information 212 may be signaled to the core network entity 330, e.g. MME 200, via the S1 inter network element interface. After receipt of the RRC connection release message 326 the mobile terminal 310 enters RRC idle mode. If an additional packet requires delivery to a dormant or idle mobile device, a new RRC connection is required, and the signaling process 300 according to FIG. 3a may start again.

If the UE or mobile terminal specific information 112, 212 with regard to radio resource allocation and/or radio management are kept at or are provided to the network, this information 112, 212 can be used for optimal setting of radio resource hence efficient resource usage when the mobile terminal is next connected to the network. This concept is similar to information communication from a source base station to a target base station during the handover in the current network.

The usefulness of keeping the UE or mobile terminal profile information 112, 212 and how that can be used to improve the radio configuration may be exemplified with the following example: Consider that a dormancy timer for an UE is set as timer T at the eNodeB. If the UE is not receiving or transmitting user data for time T, the network releases the UE's RRC connection. Thereby UE profile is also released from the network at the RRC connection release. However, the UE application generates some user data at &T after the RRC connection is released. The network establishes RRC connection for the UE and starts the dormancy timer at the network. After UE's inactivity period of time T, the connection is released. As the UEs software application is generating traffic with periodicity of T+&T, the RRC connection is required immediately after the connection release. If the UE profile of UE's previous inactivity information is, however, known to the network, the network may set the dormancy timer to be T+&T hence reduce the signaling load.

Figure 4:
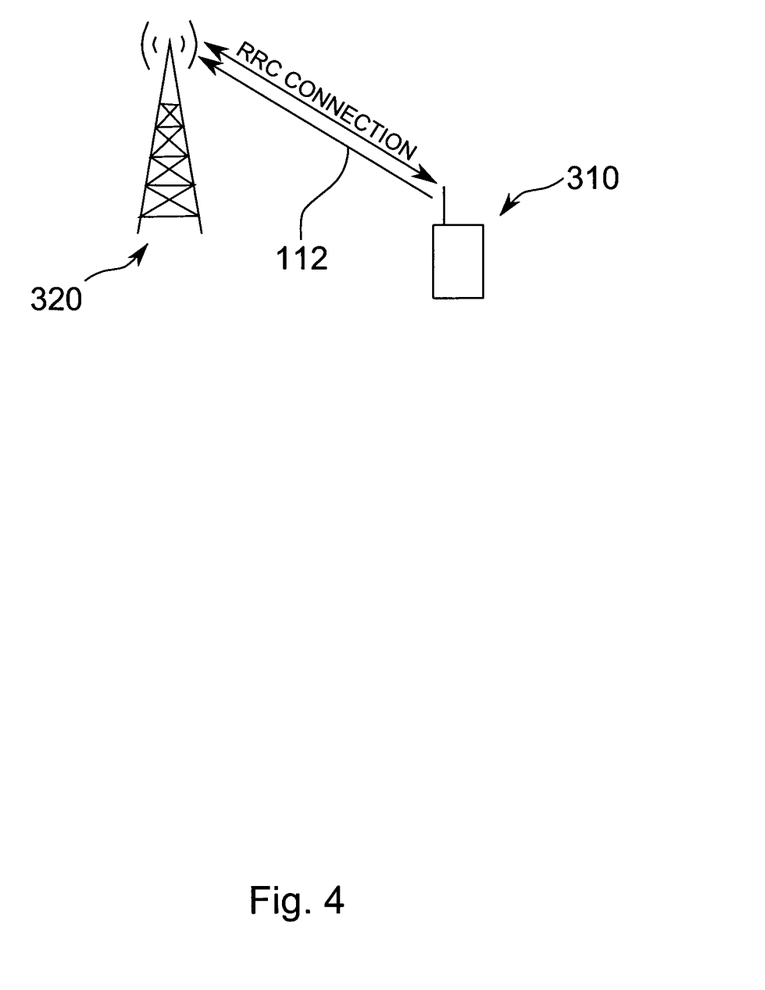
FIG. 4 shows a schematic block diagram of a mobile terminal providing information indicative of an estimate of a radio resource utilization for the established RRC connection to a base station, according to an embodiment.

Besides storing the UE/traffic profile or radio resource utilization information 112, 212 at the network said information may also be provided to the network from the mobile terminal at RRC connection setup, as it is schematically illustrated by FIG. 4.

FIG. 4 shows a mobile terminal 310 establishing a RRC connection with a network element 320 of the wireless network. The network element 320 may be a base station comprising or being coupled to a RRM entity (not shown). In this embodiment the mobile terminal 310 may comprise the apparatus 100 for providing information on the mobile terminal to the base station 320 and/or a RRM entity of the wireless communication network.

In such an embodiment the means 110 for providing the information 112 may hence be operable to provide said information 112 from the mobile terminal to the wireless communication network via at least a part of a RRC signaling message upon the establishment of the RRC connection. For that purpose the means 110 for providing the information 112 may comprise analog and/or digital transceiver circuitry for transmitting and/or receiving wireless radio signals. Furthermore, the means 110 for providing the information 112 may be operable to store the information 112, 212 in a memory device of the mobile terminal 310 upon the release of a previous RRC connection and to provide at least a part of the stored information 112 to the network entity 320 of the wireless communication network upon the establishment of the new RRC connection. Upon release of the previous RRC connection the radio resource utilization information 112, 212 may be either already available at the mobile terminal 310 or it may be signal from the network to the mobile terminal via corresponding RRC signaling message.

Figure 5A:
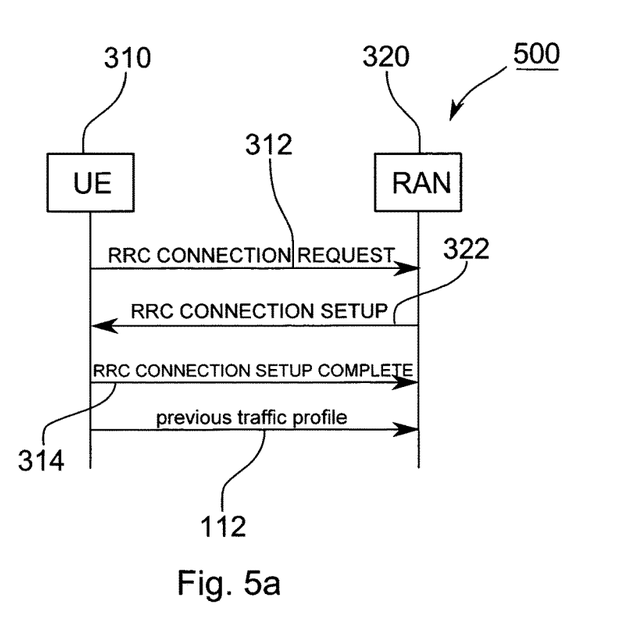
FIG. 5a,b show message sequence charts of a RRC connection establishment and release, according to yet further embodiments.

FIG. 5a shows a message sequence chart 500 of an exemplary RRC connection establishment between the mobile terminal 310 and the RAN entity 320.

When the mobile terminal 310 in RRC idle mode needs to send or receive data packets, the mobile terminal 310 may request an RRC connection with an RRC connection request message 312. Upon this RRC connection request message 312 the RAN entity 320 may confirm with a RRC connection setup message 322. Before or after the signaling of the mobile terminal's RRC connection setup complete message 314, the mobile terminal 310 may signal previously stored mobile terminal specific radio resource utilization information 112 related to a preceding RRC connection between the network and the mobile terminal 310 to the RAN entity 320, which may then adapt one or more RRM parameters, such as a dormancy timer value or a DRX profile, based on the mobile terminal specific radio resource utilization information 112 (e.g. a previous traffic profile). While FIG. 5a illustrates an embodiment where the radio resource utilization information 112 is signaled after the RRC connection setup complete message 314, said information 112 may also be signaled to the RAN entity 320 in between the messages 322 and 314.

Figure 5B:
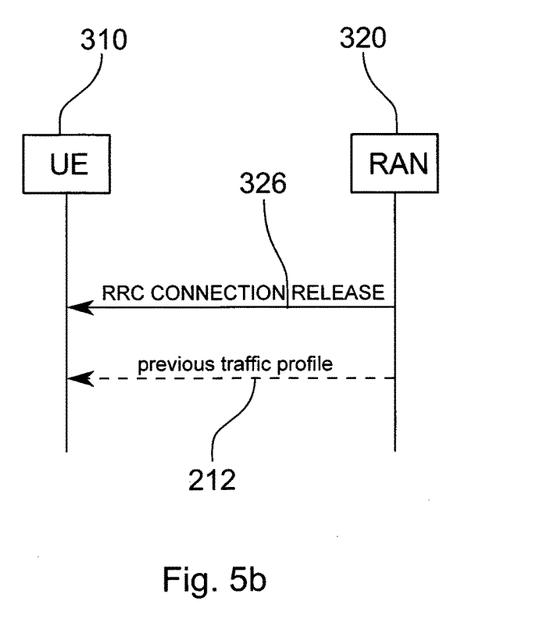

After a last data packet is transmitted or received, the wireless communication network, or the RRM entity 320 thereof, may release the established RRC connection and the mobile terminal 310 will transition to RRC idle state after the adapted dormancy timer expires. A possible RRC connection release procedure is illustrated in FIG. 5b.

Before or after signaling the RRC connection release message 324 from the RAN entity 320 to the mobile terminal 310, the corresponding latest radio resource utilization information 212, or parts thereof, may also be signaled from the RAN entity 320 to the mobile terminal 310. After receipt of said information 212 it may be stored at the mobile terminal 310. After receipt of the RRC connection release message 324 the mobile terminal 310 enters RRC idle mode. If an additional packet requires delivery to the dormant or idle mobile device 310, a new RRC connection is required, and the signaling process according to FIG. 5a may start over again. Although FIG. 5b illustrates an embodiment where the radio resource utilization information 212 is signaled after the RRC connection release message 324, said information 212 may also be signaled to the mobile terminal before messages 326. Alternatively, the information 212 may also be available at the mobile terminal 310, such that no signaling from the network is required.

According to a further embodiment of the present invention means 110, located at the mobile terminal 310, may be operable to provide the information 112 based on information on application software which is running on the mobile terminal 310 at the time of the establishment of the new RRC connection between the mobile terminal 310 and the wireless communication network. Hence, the estimate 112 of the radio resource utilization may be determined at the mobile terminal based on an expected data traffic profile cause by applications currently running on the mobile terminal at the RRC connection setup. For this purpose, the mobile terminal may be adapted to determine an estimate for an expected data traffic profile based on the applications being executed. Also, such estimated radio resource utilization information 112 may be signaled to the network, as has been explained with reference to FIGS. 4 and 5a. However, this concept does not require any backward signaling from the network to the mobile terminal 310 when the RRC connection is released as it has been described with reference to FIG. 5b. In this sense, the latter concept may, on the one hand, be less accurate, however, on the other hand, cause less RRC signaling at the RRC connection release.

To summarize: In terms of storing the UE/traffic profile information, embodiment of the present invention provide several alternatives:

Storing the UE/traffic profile at the network upon the release of RRC connection. The UE/traffic profile is delivered to the MME upon the connection release which is stored at MME. Upon establishment of a RRC connection for the UE, the eNodeB (where the UE is connected to) acquires the UE specific UE/traffic profile from the corresponding MME The UE/traffic profile is stored at the UE upon RRC connection release. Upon the establishment of RRC connection, the UE deliver the stored UE/traffic profile information to the eNodeB. The information can be used by the eNodeB for optimal configuration of radio resources for the UE UE provides the expected traffic profile at RRC connection establishment based on the knowledge of the applications running at that time and their traffic pattern.

When storing the information at the network, the UE/traffic profile (e.g.: last used DRX configuration, radio resource configuration, UE-inactivityTime, etc.) may be signaled to the MME upon the release of the RRC connection. This may be signaled in a transparent container over the S1 interface from the eNodeB to MME. The information may be stored at the MME. At the RRC connection establishment for the UE, the MME may forward the information to the corresponding eNodeB to which the UE is connected to.

Storing the information at the network has advantages of
  only network signaling is required hence no modification to the UE or air interface,
  the information know at the network prior to the RRC connection release can be stored, and
  as the method only involves network signaling, it is possible to introduced additional parameter to be stored without impacting the UE (flexibility).

Another possibility is to store the necessary information at the UE and provide the stored information to the eNodeB upon the RRC connection establishment. This method requires new RRC signaling over the radio interface to deliver the information from the UE to the network upon the RRC connection establishment.

Yet another possibility is that the UE provides the network with an expected traffic profile at RRC connection establishment. This information may be generated based on the knowledge of the application running at that time. This is similar to the previous solution, in that new RRC signaling over the radio interface is required to deliver the information from the UE to the network.

The inventive concept allows for an optimal radio resource configuration and radio resource management. This is especially important when a large number of smart UEs with diverse data application need to be supported in the network. The concept may provide efficient resource allocation, UE power saving and reduced signaling load.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. For example, the means 110 for providing information comprises information providing circuitry. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. An apparatus for providing information on a mobile terminal to a Radio Resource Management entity of a wireless communication network, the apparatus comprising:
information providing circuitry operable to provide information of radio resource utilization in a Radio Resource Control connection with a mobile terminal to a Mobility Management entity of the wireless communication network and to store said information in a memory device of the Mobility Management entity;
the information providing circuitry being operable to, during an establishment of a new Radio Resource Control connection between the mobile terminal and the wireless communication network after a period of inactivity of the mobile terminal, provide information indicative of an estimate of a radio re-source utilization for the newly established Radio Resource Control connection based on past or expected values of radio resource utilization of the mobile terminal by providing at least a part of the stored information to a base station to which the mobile terminal is attached when the Radio Resource Control connection is being established, the base station comprising the Radio Resource Management entity.

2. The apparatus according to claim 1, wherein the information providing circuitry is operable to provide information of a radio resource utilization related to a previous Radio Resource Control connection between the mobile terminal and the wireless communication network, wherein the previous Radio Resource Control connection precedes the established Radio Resource Control connection.

3. The apparatus according to claim 2, wherein the information providing circuitry is operable to store the information of the radio resource utilization related to the previous Radio Resource Control connection once a release of the previous Radio Resource Control connection between the mobile terminal and the wireless communication network has occurred.

4. The apparatus according to claim 1, wherein the information providing circuitry is operable to signal the information between a base station and the Mobility Management entity using a wired inter-face between the base station and the core of the wireless communication network.

5. The apparatus according to claim 1, wherein the information providing circuitry is operable to provide said information from the mobile terminal to the wireless communication network via a Radio Resource Control signaling message when the Radio Resource Control connection is being established.

6. The apparatus according to claim 5, wherein the information providing circuitry is operable to store the information in a memory device of the mobile terminal upon the release of the previous Radio Resource Control connection and to provide at least a part of the stored information to a network entity of the wireless communication network when the Radio Resource Control connection is being established.

7. The apparatus according to claim 5, wherein the information providing circuitry is operable to provide said information based on information on application software which is running on the mobile terminal at the time of the establishment of the Radio Resource Control connection between the mobile terminal and the wireless communication network.

8. The apparatus according to claim 1, wherein the information indicative of the estimate of the radio resource utilization comprises at least one of a radio resource configuration for the mobile terminal of a previous Radio Resource Control connection, information indicative of a inactivity-duration while the mobile terminal has not received or transmitted any user specific data from or to the wireless communication network in the previous Radio Resource Control connection, or information indicative of the mobile terminal's last visited cells during the previous Radio Resource Control connection.

9. A network entity of a wireless communication network, the network entity comprising an apparatus according to claim 1.

10. A radio resource management entity of a wireless communication network, wherein the radio resource management entity is operable to receive, during an establishment of a new Radio Resource Control connection between a mobile terminal and the wireless communication network after a period of inactivity of the mobile terminal, information indicative of an estimate of a radio resource utilization for the newly established Radio Resource Control connection based on past or expected values of radio resource utilization of the mobile terminal, and to perform a mobile terminal specific radio resource management function based on the received information;
wherein information of radio resource utilization in a previous Radio Resource Control connection with the mobile terminal was provided to a Mobility Management entity of the wireless communication network and said information was stored in a memory device of the Mobility Management entity and at least a part of the stored information is provided to a base station to which the mobile terminal is attached when the Radio Resource Control connection is being established, the base station comprising the radio resource management entity.

11. The radio resource management entity according to claim 10, wherein the information indicative of the estimate of the radio resource utilization comprises information indicative of a inactivity-duration while the mobile terminal has not received or transmitted any user specific data from or to the wireless communication network in a previous Radio Resource Control connection, and wherein the radio resource management entity is operable to configure a discontinuous reception cycle or initiate a release of the established Radio Resource Control connection after an inactivity period of the mobile terminal based on said inactivity-duration.

12. A method for providing information on a mobile terminal to a Radio Resource Management entity of a wireless communication network, the method comprising:
providing information of a radio resource utilization in a Radio Resource Control connection with a mobile terminal to a Mobility Management entity of the wireless communication network and storing said information in a memory device of the Mobility Management entity;
providing, during an establishment of a new Radio Resource Control connection between the mobile terminal and the wireless communication network after a period of inactivity of the mobile terminal, information indicative of an estimate of a radio resource utilization for the newly established Radio Resource Control connection based on past or expected values of radio resource utilization of the mobile terminal by providing at least a part of the stored information to a base station to which the mobile terminal is attached when the Radio Resource Control connection is being established, the base station comprising the Radio Resource Management entity.

13. A non-transitory computer-readable medium having stored there on a computer program having a program code for performing the method of claim 12 when the computer program is executed on a computer or processor.

* * * * *